United States Patent [19]

Meszáros et al.

[11] 4,276,478
[45] Jun. 30, 1981

[54] UNIVERSAL FLAT-FILM-CHANGING DEVICE

[75] Inventors: Sándor Meszáros; Gabriella Kirchner; János Balzer; Károly Wild, all of Budapest, Hungary

[73] Assignee: Medicor Muvek, Budapest, Hungary

[21] Appl. No.: 27,463

[22] Filed: Apr. 5, 1979

[30] Foreign Application Priority Data

Apr. 11, 1978 [HU] Hungary .............................. ME 2159

[51] Int. Cl.³ ................................................ G03B 41/16
[52] U.S. Cl. ........................................ 250/468; 250/470
[58] Field of Search ............................ 250/468, 470, 471

[56] References Cited
U.S. PATENT DOCUMENTS

| | | | |
|---|---|---|---|
| 3,955,092 | 5/1976 | Hubert | 250/468 |
| 3,959,654 | 5/1975 | Stievenart | 250/468 |

*Primary Examiner*—Craig E. Church
*Attorney, Agent, or Firm*—Karl F. Ross

[57] ABSTRACT

A film changer for X-ray equipment or the like comprises a storage cassette for a stack of unexposed films and a receiving cassette for exposed films on opposite sides of an illumination stage. The two cassettes have sidewalls with open-ended horizontal guide grooves bounded from above by ledges with beveled undersides and flat upper surfaces supporting the respective stacks, these grooves being aligned with other grooves in a guide track flanking the exposure position to define therewith a planar transport path for a film extracted from the storage cassette and inserted after exposure into the receiving cassette. The extraction is effected by a separating unit with two elastic arms which frictionally grip the underside of the lowermost film in the storage cassette adjacent its lateral edges and are then moved toward each other to draw that film off its supporting ledges as it curves downward at the center; after the remainder of the stack has descended with the next-higher film coming to rest on the ledges, the arms again move apart to let the film snap into the guide grooves of the storage cassette from which it is then advanced through the illumination stage into the guide grooves of the receiving cassette for subsequent elevation above their upper ledges by a cam-operated thruster.

8 Claims, 6 Drawing Figures

UNIVERSAL FLAT-FILM-CHANGING DEVICE

FIELD OF THE INVENTION

Our present invention relates to a universal flat-film-changing device, especially for use with X-ray-diagnostic exposure arrangements, in which the area of emplacement of the device can be disposed both immediately in the region illuminated by the X-ray beam or, with utilization of an optical system, in the image plane of a photographic camera. The universal flat-film-changing device according to the invention, however, could also be used with other picture-taking arrangements or systems.

BACKGROUND OF THE INVENTION

In the two most important phototechnical areas of the diagnostic utilization of X-radiation, i.e. where a photosensitive film is directly illuminated by the X-rays or where the illumination occurs through an optical system, the exposure times and the film-changing time must be so specified during picture taking as to satisfy the most recent and rigorous requirements corresponding to the regulations for radiation protection and diagnosis. The exposure arrangements of the X-ray diagnosis must operate in such a way that an unexposed film, stationary during the exposure (picture taking) and fixed in the image plane, selected according to the changes of the biologic processes, is always present in the exposure area at the instant of exposure, independently of the adjustment of the equipment. The exposure times required for the utilized film are established by the X-ray generator or by the photographic camera.

Independently of the dimensions or the structure of the utilized film (be it roll film or a flat film), all the installations suitable for individual exposures comprise a film-changing device.

In the exposure arrangements most widely distributed and employed at present, the problem of changing films or of creating optimal exposure conditions is solved in various ways. In the 70 mm roll-film-changing devices or cameras the film change, with the film usually inserted into the storage cassette in a darkroom, takes place according to the film-transport methods already known with motion-picture cameras. The highest image frequency amounts in rapid-changing arrangements for roll films to six pictures per second and the exposure time to 0.11 second.

On account of the increase of the quantity of information photographed, the use of the 100 mm flat films constitutes a significant advance compared with the 70 mm roll films. The increase in the dimensions results in a 100% enlargement of the image area whereby, with maintenance of the optical parameters of the given picture-taking conditions, a larger amount of information can be extracted from the individual exposures which in terms of diagnostic analysis is of great significance.

With 100 mm flat films and with still larger dimensions, the film change with the known devices enables exposure times of only 0.04 to 0.6 second with the image frequency of 6 images per second customary in flat-film equipment. The realization of these exposure or image-/dose parameters requires, in the interest of a suitable blackening of the film, a high power on the part of the X-ray generators.

The known film-changing devices suitable for 100 mm or still larger flat films solve the problem of film change as follows:

With a conventional device the unexposed films are inserted in the darkroom into a special film cassette with the individual films mutually separated inside the cassette in respective grooves. The individual films are withdrawn from the cassette inserted into the device by a lever mechanism reaching into the cassette, which operates with an advance corresponding to the spacing of the individual films, and are transferred to the film-transporting device where they are retained during exposure by a further mechanism. After the exposure the film is guided through the film-changing device into a receiving cassette.

With the described device the loading of the storage cassette in the darkroom is extremely complicated and only a maximum of 30 films at a time can be inserted into this storage cassette. The separation of the films by individual grooves, on the other hand, affords a maximum protection against static charges which can occur because of friction with the rapid relative motion of the film foils. With this device the longest still realizable exposure time at the maximum image frequency of 6 images per second amounts to 0.06 second.

With another known device, 50 or 100 films are introduced in the darkroom in a package into the storage cassette. The films are transferred from the automatically opening storage cassette, inserted into the camera, by a mechanism wherein the individual films are curved upwardly under pressure and are extracted with the aid of a gripper with relative sliding motion. During the exposure the film is retained in the image plane by a further mechanism. After the exposure the film is guided by a film-transport mechanism into the receiving cassette.

With this solution the insertion of the films into the storage cassette is relatively simple. From the mode of film transport, however, it follows that this system is very sensitive to the film thickness and the surface condition of the film is also highly significant. Thus, if the film does not have the desired parameters, major difficulties immediately result upon the separation of the individual films. Moreover, this solution offers no protection against the static charges occurring through the relative sliding of the films during film separation. It therefore can occur that the picture becomes unusable on account of a discharge. The repetition of the picture-taking operation, however, increases not only the costs but also the radiation exposure of the patient. The highest image frequency here obtainable is 2 images per second with an exposure time of 0.05 second. This low image frequency is the result of the opposite movement of the films in the film-changing device where the film separation and transport is solved in an exceedingly complicated and uneconomical manner whereby much time is lost.

The aforedescribed solutions presuppose in every instance a certain picture-taking technique whereby their utilization is tied in each case to a certain exposure arrangement and a predetermined film size.

OBJECTS OF THE INVENTION

The general object of our present invention is the elimination of the disadvantages of the known devices, the increase in the efficiency and operational safety of the exposure arrangements, especially in X-ray diagnosis, as well as a better and more reliable care for the patient in this connection.

A more particular object of our invention is the provision of a universally utilizable flat-film-changing device which, independently of the dimensions of the utilized film, can insure an exposure time of 0.1 second with an image frequency of 6 images per second, has a unitary construction independent of the exposure technique, affords maximum protection against static charges of the film and enables the simple insertion and withdrawal of at least 100 films in a package, which simplifies the work in the darkroom.

SUMMARY OF THE INVENTION

A film changer according to our invention, to be used with an apparatus which is provided with an illumination stage for the exposure of a photosensitive film, comprises two cassettes removably disposed on opposite sides of that illumination stage, namely a storage cassette for unexposed film and a receiving cassette for exposed film. Both cassettes have sidewalls respectively provided with coplanar open-ended first and second guide grooves in line with grooved track means interposed between them to define therewith a planar transport path for a film extracted from the storage cassette and transferred to the receiving cassette, after passing through the illumination stage, by intermittently operating feed means. With a stack of unexposed films resting on first supporting means in the storage cassette above the guide grooves thereof, and upon withdrawal of a bottom plate normally closing that cassette, the lowermost film of that stack is engageable by separating means synchronized with the feed means for drawing that film into the first guide grooves through the open cassette bottom and then displacing the film into engagement with the feed means preparatorily to its exposure in the illumination stage. The receiving cassette is provided with lifting means operable by the feed means for elevating the exposed lowermost film, after its insertion into the second guide grooves, into engagement with second supporting means in the receiving cassette to clear the way for another unexposed film from the storage cassette which is to be moved along the same transport path and transferred to the receiving cassette after having been exposed.

Pursuant to a more particular feature of our invention, the first and second supporting means in the two cassettes are ledges respectively overhanging the corresponding guide grooves. The separating means may then comprise a pair of resilient arms, normally withdrawn below the level of the first guide grooves, and a mechanism for raising these arms into frictional contact with the underside of the lowermost film adjacent lateral edges thereof overlying these guide grooves, the mechanism drawing these arms toward each other with frictional entrainment of the lateral film edges and downward curving of the film to clear the overhanging ledges and, upon a descent of the remainder of the stack onto the ledges of the storage cassette, moving the arms apart to let the lateral film edges enter the guide grooves.

Pursuant to a further feature of our invention, the feed means include a first and a second transport roller and an entrance end and an exit end of the illumination stage as well as a linkage controlled by the aforementioned mechanism for pushing the lowermost film toward the first transport roller upon entry into the guide grooves of the storage cassette, this mechanism preferably comprising a pair of nonrotatable hub members traversed by a drive shaft which carries cam means for reciprocating the hub members along the drive shaft. The resilient arms of the separating means, respectively articulated to the two hub members, coact with stationary ramp surfaces for swinging in a transverse plane upon movement of the hub members toward and away from each other, these hub members being further provided with projections engageable with the aforementioned linkage.

The flat-film-changing device according to the invention has the advantage that, by virtue of its simple and uniform construction, it requires only a short exposure time and can be used independently of the picture-taking technique both with direct exposure and with utilization of an optical system, the construction changing according to the utilized film format only in its dimensions and speeds.

A further advantage resides in that the operations in the darkroom are considerably simplified and that a large number of film foils can be simply inserted into the cassettes. The separation of the films according to the invention eliminates the problems which can arise from static charges of the films.

The flat-film-changing device according to the invention enables by virtue of its structure a large exposure (illumination) period of 0.1 second with the customary image frequency of 6 image/second whereby the X-ray generators need only develop a correspondingly lower power for suitable blackening of the film.

The device according to the invention, however, operates not only fast and economically but also extremely safely since its film-separating and transporting mechanisms completely prevent the withdrawal of more than one film at a time, thus avoiding any jamming of the transport path, and since, as already mentioned, no static charges or discharges can occur with this device. It is thus not necessary to repeat the picture-taking exposures for technical reasons and the radiation exposure of the patients need not be further increased.

BRIEF DESCRIPTION OF THE DRAWING

The above and other features of our invention will be described in detail with reference to the accompanying drawing in which an advantageous embodiment of the invention has been illustrated. In the drawing.

SPECIFIC DESCRIPTION

Figure 1:
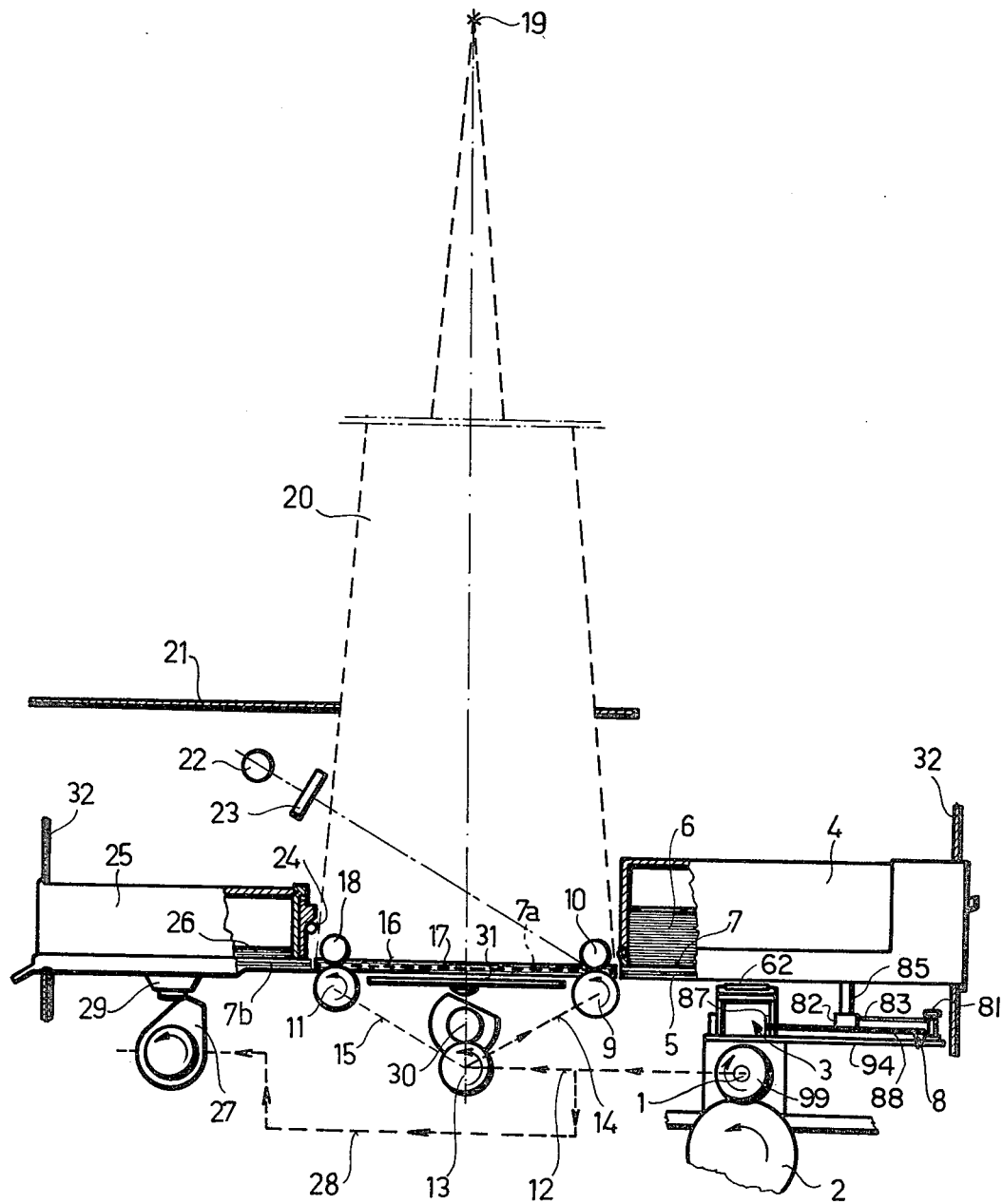
FIG. 1 schematically illustrates, in elevation and with parts broken away, the basic structure of a flat-film-changing device according to the invention.

FIG. 1 is a schematic respresentation, independent of the utilized picture-taking technique, of a flat-film-changing device according to the invention. As is apparent from FIGS. 1 and 4, a shaft 1 forms the main drive member of the entire device. This shaft is driven via a gear 2 and a pinion 99 by a motor which is programmable according to the image frequency. To each revolution of shaft 1 corresponds an entire film-changing cycle.

The flat-film-changing device according to the invention consists essentially of a storage cassette 4 for the reception of an unexposed film package 6, a film-separating unit 3, a film-feed mechanism 8, film-transport rollers 9, 11 and guide rollers 10, 18 as well as a receiving cassette 25. The two cassettes 4, 25 lie on opposite sides of an illumination stage bracketed by the roller pairs 9, 11 and 10, 18.

After a certain rotation of shaft 1 the lowest film 7 of the film package or stack 6 is removed by the film-separating unit 3 into a pair of open-ended guide grooves 5 (see also FIG. 4) on opposite sidewalls of the storage cassette 4. After its separation, the film 7 is pushed on account of a further rotation of the shaft 1 by the film-feed mechanism 8 between the pair of rollers 9 and 10 started up simultaneously with that mechanism. The film-transport rollers 9, 11 are driven upon further rotation of shaft 1 via motion-transmitting links 14, 15 by a shaft 13 which is operatively connected by way of a motion-transmitting link 12 with the main shaft. The shaft 13 performs a periodic intermittent rotation which can be achieved by conventional means such as a Geneva motion. The periodically operating transport roller 9 allows the advanced film 7—pressed down by the guide roller 10 and guided in the grooves 5 of the storage cassette 4 and open-ended grooves 17 of a guide track 16 disposed in the image plane of the illumination stage—to pass between a further transport roller 11 and a guide roller 18, and arrests the film in a position 7a, the film 7 being immobilized for the duration of the exposure at its corners by the roller pairs 9, 10 and 11, 18 respectively. By elastically pressing the film-transport rollers 9 and 11 and the guide rollers 10 and 18 against each other, we can make the film-feed system insensitive to both the thickness and the tolerances of the film used. The film located in position 7a in the exposure plane is illuminated by the X-rays or light rays arriving in a beam 20 from a focal point 19, or from an image plane in the presence of an optical system interposed between the beam source and the film. With such an optical system the path of the light beam 20 is blocked during film change by a shutter 21. The shutter 21, operated directly by the shaft 1, is needed only in certain instances for blocking the continuous light beam illuminating the film position 7a. With an image frequency of 6 images/second, the film is halted for the sake of exposure for 0.11 second in the position 7a in the plane of the illumination stage, the maximum exposure time being 0.1 second. Concurrently with the exposure, the data of the patient as well as the numbering of the film are projected upon the film by an optical system 22 via a data carrier 23. In the last phase of the film-changing cycle the film-separating unit 3 is again actuated by a further partial revolution of shaft 1, the film-separating unit 3 returning the film-feed mechanism 8 to its starting position and drawing the next-lower film 7 of the stack 6 down into the guide grooves 5 of the storage cassette 4. Thereafter the film-feed mechanism 8 begins to advance the new film in the guide grooves 5 into engagement with roller pair 9, 10. Concurrently with this advance, immediately after the exposure of the preceding film, roller pair 11, 18 is set in motion and delivers the exposed film—concurrently with the further advance of the new film in the guide grooves 5—into the receiving cassette 25 which upon insertion into the film-changing device is automatically opened by a lug 24. While the exposed film moves into the receiving cassette 25, more precisely into a position 7b defined by its guide grooves 105 (see FIG. 6), the unexposed film reaches the position 7a in the exposure region. Thereafter the periodically rotating transport rollers 9 and 11 are halted and this terminates an exposure cycle. The time of motion of the simultaneously advanced films amounts with an image frequency of 6 images/second to 0.056 second.

In the receiving cassette 25 the film located in position 7b is brought by a camming mechanism 27 into the elevated position above grooves 105. The camming mechanism 27 driven by shaft 1 via a motion-transmitting link 28 operates as follows:

After the film change, at the beginning of the new exposure cycle, a thruster 29 of the receiving cassette 25 (more fully described hereinafter with reference to FIG. 6) is pushed up by the cam 27 and the exposed film is now lifted by thruster 29 from position 7b into an elevated position to become part of a stack 26. Thus, a film-changing cycle with the device according to the invention is executed with an image frequency of 6 images/second in 0.166 second. Any changes in the film dimensions require only a change of the diameter or of the rotary speed of the transport rollers 9 and 11.

With films larger than 100 mm, a film-supporting plate 31 is lifted by a camming mechanism 30 controlled by the shaft 13 whereby the film located in position 7a is protected against bending and is maintained in a straight plane. The film-changing device is enclosed in a housing 32.

Figure 2:
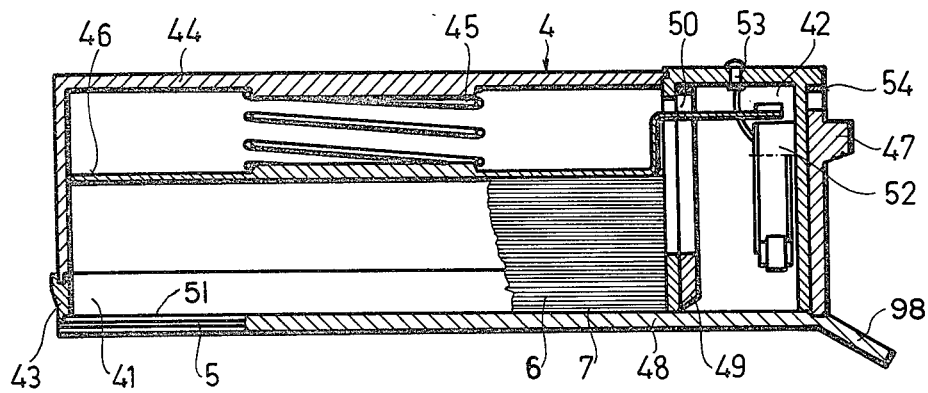
FIG. 2 is a schematic longitudinal sectional view of a storage cassette forming part of the film-changing device according to FIG. 1.
Figure 3:
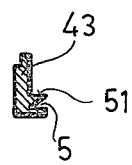
FIG. 3 is a detail view showing the profile of a converging guide groove of the storage cassette of FIG. 2.

FIG. 2 shows details of the storage cassette 4 of FIG. 1. It will be apparent that the storage cassette 4 is functionally divided into two compartments, namely a film-storage compartment 41 and a film-number-sensing compartment or light-gate chamber 42. Upon the insertion of the films into the cassette in the darkroom, a lower part 43 of the cassette is separated from an upper part 44 and the film package 6 is placed on a pressure plate 46 provided with a spring 45. After emplacement of the storage cassette 4 in the film-changing device, the system can be brought into operating condition only if, after a raising of an outer light gate 47, a closure plate 48 inserted into the guide groove 5 in a lighttight manner in the darkroom is withdrawn. With the withdrawal of the closure plate 48 there is simultaneously also established storage-cassette-side electric readiness circuit for exposure, and an inner light gate 49 loaded by a spring 50 is closed. After the withdrawal of the closure plate 48 the lowest film 7 of package 6, extractable by the film-separating unit 3, rests on ledges 51 forming the upper boundaries of the guide grooves 5 of the cassette part 43 (see also FIGS. 3 and 4) against which it is forced by the pressure plate 46 loaded by the spring 45. An electrical switch 52 disposed in the light-gate chamber 42 and actuated by the pressure plate 46 indicates via an electrical contact 53 when in the storage cassette 4 there are only 10±1 pieces of unexposed film. (This tolerance results from the deviations in the thickness or in the dimensions of the film used.) After extraction of the closure plate 48 the bottom of the storage cassette 4 is open so that the film-separating unit 3 can transfer the lowest film 7 of package 6 for further transport to the illumination stage into the guide grooves 5 as will be described in greater detail with reference to FIG. 4.

The storage cassette 4 can be withdrawn from the film-changing device when the outer light gate 47 is pulled up, with simultaneous release of the mechanical latching of the cassette in the device, whereupon plate 48 is inserted into the guide grooves 5 as a result of which the inner light gate 49 is pushed automatically upward and breaks the readiness circuit of the storage-cassette-side exposure switch. After the re-engagement of the light gate 47, which is biased by a spring 54, the storage cassette 4 can be withdrawn by a tab 98, forming a sloping surface of the closure plate 48, for the purpose of refilling.

Figure 5:
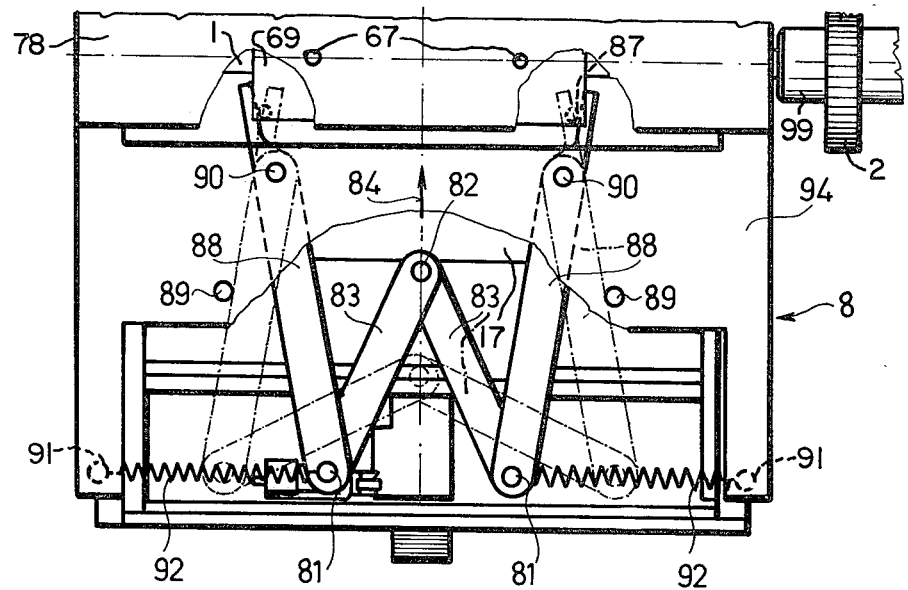
FIG. 5 is a schematic bottom view of a film-feed mechanism included in the device of FIG. 1.
Figure 4:
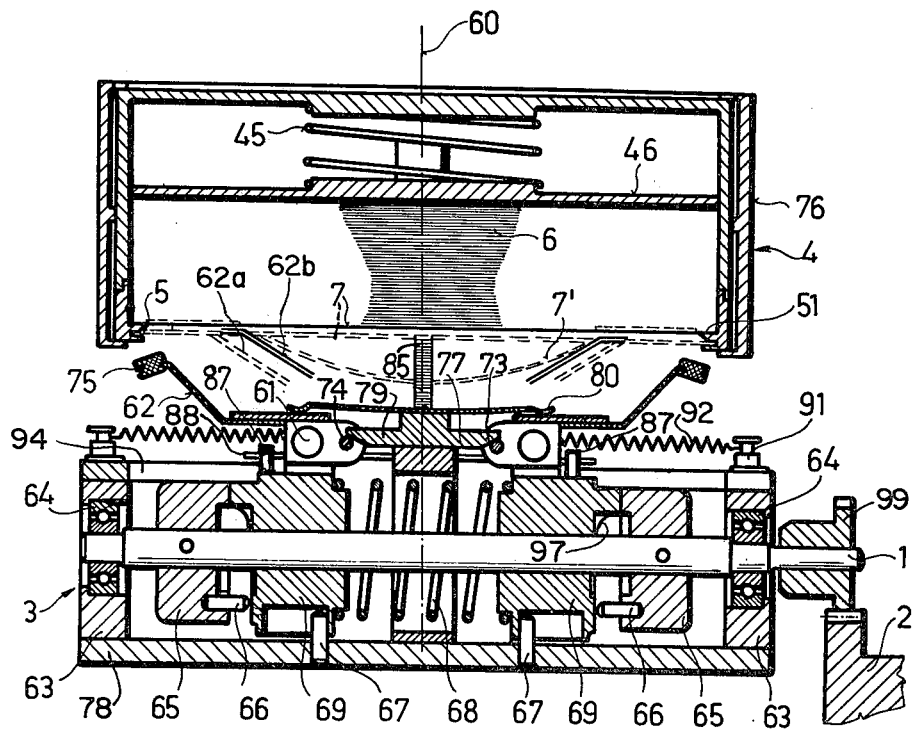
FIG. 4 is a cross-sectional view of a film-separating unit forming part of the film-changing device according to FIG. 1.

FIG. 4 shows the film-separating unit 3 of the film-changing device in section and FIG. 5 is a schematic representation of its film-feed mechanism 8. The film-separating unit 3 and the film-feed mechanism 8 are mounted on the main shaft 1 which is journaled in bearings 64 of mountings 63 in a housing 78. Two-thirds of the separation and advance of the film occur during the exposure period as follows:

Symmetrically fastened to the shaft 1, in the same angular position, are hubs 65 from which hardened pins 66 project. The pins 66 of the hubs 65 rest on cam tracks 97 of respective hubs 69, held by pins 67 against rotation, which are axially loaded by an interposed pressure springs 68. Upon rotation of shaft 1 the pins 66 strike the rising cam track 97 and press the hubs 69 symmetrically toward a centerline 60. On account of this shift two elastic lever arms 62 fastened to the hubs 69, which are swingable about pivots 61 and are designed according to the dimensions of the utilized film, are forced by pins 74 coacting with wedge faces 73 of a fixed ramp 79 to rise into a position 62a (shown in dotted lines) whereby frictionally adhering contact surfaces of pads 75 at the free ends of these arms are pressed against the lowermost film 7 in the storage cassette 4. The storage cassette 4 is carried by a rail structure 76. The film 7 (and with it also the entire film package 6) is pressed onto the ledges 51 of the guide grooves 5 against the resistance of the elastic lever arms 62 by the spring 45 acting upon the pressure plate 46. Upon a further rotation of shaft 1 the hubs 69 are shifted by the pins 66, riding up the peaks of their cam tracks 97, still farther toward the centerline 60 whereby the elastic lever arms 62 are horizontally guided by their pins 74, engaging a lower surface 77 of the ramp 79, into a position 62b shown in thin solid lines. The elastic lever arms 62 press themselves with the adhesive contact surfaces of pads 75 during this horizontal movement against the film 7, letting its ends slide somewhat on the overlying film inwardly and finally drawing the film 7 into a curved shape 7 and off the ledges 51 of the storage cassette 4. In its place the next film of the stack 6 is being pressed by plate 46 onto the ledges 51. As the result of the further rotation of the shaft 1 the pins 66 descend from the cam peaks of the hubs 69 and allow the system to go under the action of spring 68 into a reverse motion. Thereby the elastic lever arms 62, biased downward by a spring 80, are moved apart in a horizontal direction into the position 62a to flatten the film 7. During this movement the lateral edges of the film 7 are bent over because of its elasticity and finally are guided by the beveled lower ledge surfaces, best seen in FIG. 3, into grooves 5 after a further rotation of the shaft 1 during which the pins 74 move over the sloping surfaces 73 of ramp 79, causing a downward swing of the lever arms 62 whereby the pads 75 are separated from the film 7. At about 25% of the path length from the shifting of the elastic lever arms 62 along sloping surfaces 73, studs 87 on hubs 69 come into contact with arms 88 of a W-shaped linkage, also including two shorter arms 83, which forms part of the film-feed mechanism 8 (see FIGS. 1 and 5). This mechanism then starts the advance of the film as follows:

By reason of the displacement of studs 87, the arms 88 originally bearing upon stops 89 are turned about their fulcra 90 whereby a common. pivot point 82 of arms 83, which are articulated to arms 88 at 81, is shifted rectilinearly in a forward direction 84 against the force of two tension springs 92 anchored to a pair of fixed pins 91. With this shift the film located in the guide grooves 5 is thrust by a bent spring 85 (FIGS. 1 and 4) between the transport and guide rollers 9, 10 of FIG. 1. At the beginning of a new film-separating cycle, and with the hubs 69 in their position of closest approach as described above, the film-feed mechanism 8 occupies, by reason of the traction exerted upon joints 81 by the tension spring 92, the starting position in which arms 88 abut the stops 89 as indicated in phantom lines. The spring 85 is bent upon the insertion or withdrawal of the storage cassette. The film-feed mechanism 8 is carried by a supporting plate 94 also shown in FIG. 1.

Figure 6:
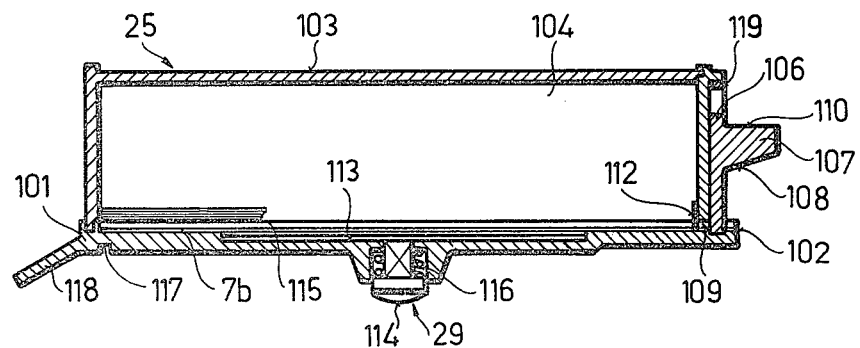
FIG. 6 is a schematic longitudinal sectional view of a cassette forming part of the film-changing device accoding to FIG. 1.

In FIG. 6 the receiving cassette 25 of the flat-film-changing device according to the invention has been shown in longitudinal section. From the Figure it is apparent that this cassette 25 consists of two main portions, i.e. a lower portion 101 with guide grooves 102 and an upper portion 103, interconnected in a lighttight manner. The portions 101 and 103 define a storage space 104 from which the film package containing the exposed films can be extracted in the darkroom after the opening of the main portions. After reassembly of the portions 101 and 103 the receiving cassette is again ready for use. The insertion of the exposed films into the cassette is carried out as follows:

Upon the insertion of the receiving cassette 25 into the film-changing device, the underside 108 of a cam 107 of a light gate 106 is pushed onto the lug 24 (FIG. 1) whereby the light gate 106 is lifted and an aperture 109 of the cassette part 101 in line with the open-ended grooves 102 is opened up to receive the exposed film. By the lifting of the light gate 106 an operating switch mounted in the film-changing device is actuated by an upper surface 110 of cam 107 to close a receiving-cassette-side readiness circuit for the control of an associated counter. Through the opened-up aperture 109 the exposed film, transported by rollers 11 and 18, is led in the guide grooves 102 into position 7b (see FIG. 1), the profile of the guide grooves 102 corresponding to that of the converging guide grooves 5 of the storage cassette 4. The recoil of the film arriving at high speed in the guide grooves 102 is braked by an elastic textile plate 112 pasted upon the part 101 of the receiving cassette 25. The film located in position 7b is lifted by a rising plate 113, forming part of thruster 29, into the storage compartment 104.

The lifting of the plate 113 is brought about by a nonrotatable pin 114 mounted thereon which penetrates the cassette bottom and is operated by the cam 27 of FIG. 1 at a suitable point in the cycle. The central part of the film in position 7b is curved by the rising plate 113 whereby the lateral edges of the film slide out of the guide grooves 102 and because of the elasticity of the film jump onto ledges 115 forming the upper boundaries of these guide grooves. After the lifting of the film above ledges 115, the plate 113 biased downward by a spring 116 returns to its starting position. The position of the receiving cassette 25 can be fixed in the film-changing device by a nonillustrated latch engaging in a groove 117.

The receiving cassette 25 can be withdrawn from the film-changing device by a tab 118 after the retraction of the mechanical latch from groove 117. Upon such withdrawal the surface 108 slides off the lifting lug 24 whereby the light gate 106 loaded by a spring 119 is automatically closed. At the same time, on account of the removal of the upper cam surface 110 coacting with the electrical switch, the receiving-cassette-side readiness circuit is broken and the counter is reset.

It will thus be seen that our invention enables the films to be inserted into the storage cassette in a package, that the films can be individually separated in the operating condition within the cassette by open-ended guide grooves with the aid of suitable mechanical means, and that they can be further advanced by the same mechanism. It is furthermore advantageous that the entire film-changing system is driven by a single main shaft and that the unexposed and exposed films are displaced simultaneously and codirectionally for exposure and storage, respectively, the exposed films being separated by guide grooves of the receiving cassette from the other films without sliding one on the other upon being placed in storage.

Our improved film changer is furthermore advantageous in comparison with conventional systems, in which for example the films must be individually inserted into the storage cassette or where the films are extracted by means of supplemental film-removing devices, since the insertion of the film into the cassette is very simple, requiring little storage space, and static charges due to the sliding of the films on one another is prevented, and since it facilitates the concurrent and codirectional shifting of the films at a high image frequency with long exposure time.

Certain features of our invention can be used independently of one another thus, for example, the film-changing device according to the invention can be driven mechanically as well as electrically or pneumatically.

The system according to the invention can be used at various X-ray-technical operating sites which can be disposed both in the region illuminated by the X-ray beam and—with employment of an optical system—in the image plane of a picture-taking camera.

Finally, production of our device can be economically standardized to provide a uniform structure, with variations of its dimensions according to the film size, and the image frequency can be varied through a corresponding adjustment of the rotary speed of the main shaft according to the desired phototechnical requirements.

We claim:

1. A film changer for an apparatus provided with an illumination stage for the exposure of a photosensitive film, comprising:
   a storage cassette for unexposed film and a receiving cassette for exposed film removably disposed on opposite sides of said illumination stage, said cassettes having sidewalls respectively provided with coplanar open-ended first and second guide grooves, said storage cassette being provided with a withdrawable closure plate at its bottom;
   grooved track means between said cassettes aligned with said guide grooves for defining therewith a planar transport path for a film extracted from said storage cassette and transferred to said receiving cassette after passing through said illumination stage;
   feed means adjoining said track means for intermittently advancing a film along said transport path;
   separating means underneath said storage cassette synchronized with said feed means and engageable upon withdrawal of said closure plate with a lowermost film of a stack of unexposed films, held by first supporting means in said storage cassette above said first guide grooves, for drawing said lowermost film into said first guide grooves through said bottom and thereupon displacing said lowermost film into engagement with said feed means preparatorily to an exposure thereof in said illumination stage; and
   lifting means in said receiving cassette operable by said feed means for elevating said lowermost film, after exposure thereof in said illumination stage and insertion into said second guide grooves, from said second guide grooves into engagement with second supporting means in said receiving cassette, thereby clearing the way for another unexposed film from said storage cassette to be moved along said transport path and transferred after exposure to said receiving cassette.

2. A film changer as defined in claim 1 wherein said first and second supporting means are ledges respectively overhanging said first and second guide grooves.

3. A film changer as defined in claim 2 wherein said separating means comprises a pair of resilient arms normally withdrawn below the level of said first guide grooves and mechanism for raising said arms into frictional contact with the underside of said lowermost film adjacent lateral edges thereof overlying said first guide grooves, drawing said arms toward each other with frictional entrainment of said lateral edges and downward curving of said lowermost film to clear the ledges overhanging said first guide grooves and, upon a descent of the remainder of the stack in said storage cassette onto the ledges thereof, moving said arms apart to let said lateral edges enter said first guide grooves.

4. A film changer as defined in claim 3 wherein the ledges in said storage cassette have beveled lower surfaces facilitating the introduction of said lateral edges into said first guide grooves.

5. A film changer as defined in claim 3 or 4, further comprising a spring-loaded pressure plate in said storage cassette overlying the stack of unexposed films for ensuring the descent of the stack onto the ledges overhanging said first guide grooves.

6. A film changer as defined in claim 3 or 4 wherein said feed means includes a first transport roller at an entrance end of said illumination stage, a second transport roller at an exit end of said illumination stage, and a linkage controlled by said mechanism for pushing said lowermost film toward said first transport roller upon entry into said first guide grooves.

7. A film changer as defined in claim 6 wherein said feed means includes a drive shaft transverse to said transport path, said mechanism comprising a pair of nonrotatable hub members traversed by said drive shaft and cam means on said drive shaft for reciprocating said hub members along said drive shaft, said arms being respectively articulated to said hub members and coacting with stationary ramp surfaces for swinging in a transverse plane upon movement of said hub members toward and away from each other, said hub members being further provided with projections engageable with said linkage.

8. A film changer as defined in claim 1, 2, 3 or 4 wherein said closure plate is insertable into said first guide grooves, said storage cassette being provided at an end remote from said illumination stage with an outer light gate interfitting with the inserted closure plate and with an inner light gate sealing off said remote end upon the withdrawal of said closure plate.

* * * * *